Figure 1:
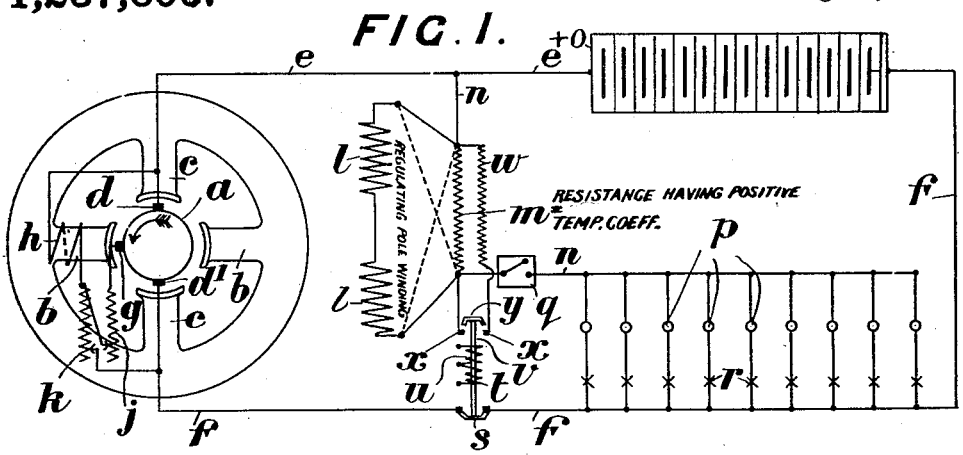

A. H. DARKER.
DYNAMO ELECTRIC GENERATOR.
APPLICATION FILED MAR. 15, 1915.

1,237,306.

Patented Aug. 21, 1917.

Inventor.
Alfred Henry Darker.
By (signature) att.

UNITED STATES PATENT OFFICE.

ALFRED HENRY DARKER, OF BLACKHEATH, ENGLAND, ASSIGNOR TO J. STONE & COMPANY LIMITED, OF DEPTFORD, ENGLAND.

DYNAMO-ELECTRIC GENERATOR.

1,237,306.   Specification of Letters Patent.   Patented Aug. 21, 1917.

Application filed March 15, 1915.   Serial No. 14,383.

*To all whom it may concern:*

Be it known that I, ALFRED HENRY DARKER, a subject of the King of Great Britain, and resident of Heath View, Montpelier Row, Blackheath, in the county of Kent, England, have invented new and useful Improvements in and Connected with Dynamo-Electric Generators, of which the following is a specification.

This invention comprises improvements in and connected with dynamo electric generators and has for its object to provide means for regulating or controlling the generation of current in cases where the dynamo is connected up with a battery or batteries and a consuming circuit, the latter being usually a lamp circuit, and is required to either charge the battery or supply the consuming circuit, or to both charge the battery and at the same time supply the consuming circuit, the battery being employed for supplying the consuming circuit or lamps when the dynamo is not running. Systems of this nature are largely used for train lighting.

It is known to connect the windings of interpoles across a suitable resistance in an external circuit whereby the degree of magnetization of the interpoles will depend upon the voltage drop across such resistance, which voltage drop depends upon the amount of current passed through the said resistance.

According to this invention in an installation or system comprising a self-regulating dynamo, a battery circuit and a consuming circuit, regulating pole windings are connected across a resistance in the consuming circuit so that the output of the dynamo is varied in accordance with the quantity of current flowing through the consuming circuit. Supposing, therefore, that the consuming circuit comprises a number of lamps or sets of lamps, it will be readily understood that when all the lamps are in circuit a maximum quantity of current will flow through the resistance across the terminals of which a maximum potential difference will exist. This difference of potential being impressed on the regulating pole windings such windings then produce a maximum magnetization of the regulating poles which will modify the distortion of the generating flux to such an extent as to enable the dynamo to give the desired output. Suppose now that some of the lamps are switched off, the quantity of current flowing through the resistance and the potential difference across the resistance are reduced and the regulating pole windings will produce a weaker flux through the regulating poles so that the distortion of the generative flux due to armature reaction will be allowed to increase and the output of the dynamo will be correspondingly reduced.

A self-regulating dynamo adapted for these improvements comprises field windings connected between one of the main brushes and an intermediate auxiliary brush, the auxiliary brush being usually situated about opposite the middle of a main pole when considering an ordinary armature of the Gramme ring type.

In order to enable the invention to be readily understood reference is made to the accompanying drawings in which:—

Figure 2:
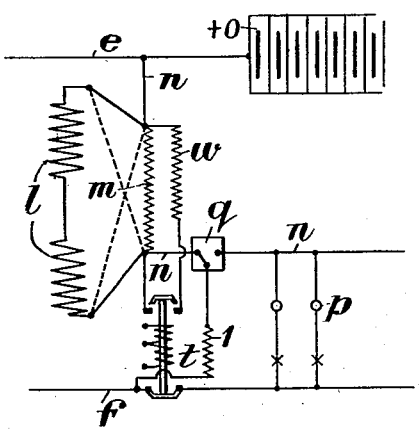
Figure 3:
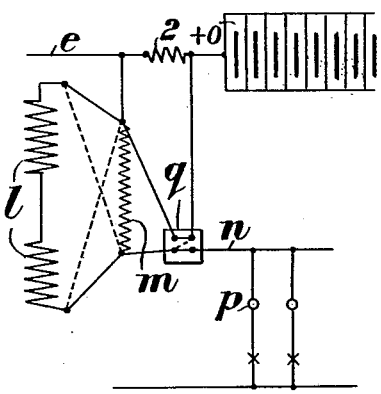
Figure 4:
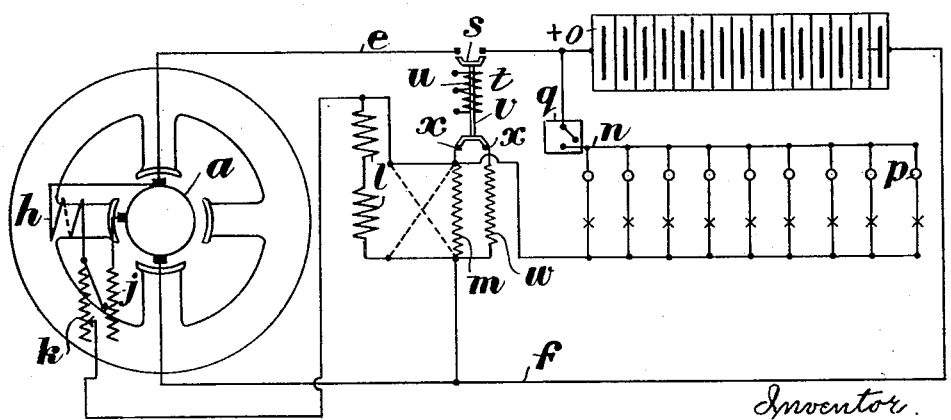

Figure 1 is a diagram of a train lighting system having these improvements applied thereto, and Figs. 2, 3 and 4 are diagrams illustrating modifications.

$a$ is the armature of the dynamo, the latter being conveniently constructed with two main poles $b$ and two regulating poles or interpoles $c$. $d$ is the positive brush connected with the positive main $e$ and $d'$ is the negative brush connected with the negative main $f$. Any suitable automatic reversing or pole-changing switch may be employed, as is usual in train-lighting systems, for preserving the polarity when the direction of running is reversed. The self regulation of the dynamo during variation of speed may be brought about by using, in known manner, a third brush $g$ between which and the brush $d$ are connected the main field windings $h$. It is preferred to connect in series with these windings an adjustable resistance $j$ which may be varied in any preferred manner as by a hand lever or the like, if manual operation be desired in preference to automatic operation. It is also preferred to connect the winding $h$ to the opposite brush $d'$ through an adjustable resistance $k$ and this resistance also may be varied by hand-operated means, or automatically, as desired. The resistances $j$ and $k$ may, if desired, be wound on the main poles of the dynamos.

The regulating pole windings $l$ which are shown removed for sake of clearness, are connected across a resistance $m$ in the conductor $n$ leading to the consuming circuits, which conductor $n$ branches from the positive main $e$, the latter being connected to the positive pole of the battery $o$. Upon reversal of direction of running the main poles $b$ retain their polarity whereas the polarity of the regulating poles $c$ is required to reverse. For this reason the terminals of the interpole windings $l$ are connected with the terminals of the resistance $m$ through the medium of an automatic reversing switch not shown. Therefore, in one direction of running, the windings $l$ will be connected across the resistance $m$ as shown in full lines, and in the opposite direction of running the windings $l$ will be connected as indicated by the dotted lines. The consuming circuit which includes the lamps $p$ is controlled by a main lighting switch $q$ and each lamp or set of lamps is controlled by its respective switch $r$. A solenoid $t$, having its main winding connected across the terminals of the dynamo, is so designed that it only sucks up its core and closes the main circuit switch $s$ when the desired voltage exists at its terminals. The solenoid may also comprise a series winding $u$ which is inserted in the main $e$ between the point at which the conductor $n$ branches and the positive pole of the battery $o$, so that the winding $u$ assists the winding $t$ in holding up the core $v$ so long as the dynamo supplies current to the battery $o$. Immediately the speed and voltage of the dynamo decrease to such an extent that the battery $o$ supplies current to the lamps $p$, the direction of current flow in the winding $u$ is reversed and further weakens or demagnetizes the solenoid, which is already weakened owing to the decreased voltage applied to its winding $t$, so that the core $v$ drops quickly and opens the main switch $s$.

When the dynamo no longer supplies current to the lamps and the latter are being supplied exclusively by the battery $o$, it is desirable that the value of the resistance $m$ should be reduced in order that the same voltage may be applied to the lamp terminals as when the dynamo was the source of current supply. For this purpose a small resistance $w$ or a conductor having a suitable resistance, is connected in shunt with the resistance $m$. The lower terminals of the resistances $w$ and $m$ are connected with switch terminals $x$ which are bridged by a brush $y$ on the core $v$ when the latter falls and opens the main circuit switch $s$.

It will now be seen that when the dynamo is working and all the lamps $p$ are switched on, there will be a maximum difference of potential between the terminals of the resistance $m$ and consequently there will be a maximum flow of current in the windings $l$. In other words the windings $l$ and resistance $m$ being in parallel, it follows that when the flow of current in the conductor $n$ is at a maximum, it will also be at a maximum in the resistance $m$ and windings $l$. Therefore when all the lamps are on, the regulating poles $c$ receive a maximum magnetization and modify or correct to a maximum degree the distortion effects due to armature reaction, thereby enabling the output of the dynamo to fully meet the demand.

The output of the dynamo can be adjusted to meet any particular demand within the capacity of the machine by varying the extent to which the regulating poles $c$ modify or correct the distortion due to armature reaction. When all the lamps were assumed to be switched in, it was seen that the windings $l$ had a maximum effect, the distortion being counteracted to such an extent that a sufficient number of lines of force remained between the brushes $d$ and $g$ to produce an energization of the windings $h$ adequate for the magnetization of the dynamo for producing the maximum output at cutting in speed. This output remained constant for all speeds by reason of the self-regulating character of the dynamo explained above.

Assume that the number of lamps $p$ in circuit is reduced by one half, then the current in the wire $n$ will be reduced by one half, if all the lamps $p$ are of the same type and size, and the current in the resistance $m$ and windings $l$ will be correspondingly reduced. The flux due to the windings $l$, being weakened, will permit of a greater distortion effect due to the armature reaction and the output of the dynamo will be reduced to suit the reduced demand and this output will remain constant for all speeds until the demand is again altered. In this way any number of lamps may be switched on or off and the output will be automatically adjusted to suit the demand in every case, so that the battery $o$ may always receive about the same charging current in spite of varying consumption in the lamp circuit.

By regulating the resistances $j$ and $k$ the dynamo may be given any desired characteristic. If the resistance $j$ be low and the resistance $k$ high, the dynamo will be self-regulating as above described. By decreasing the resistance $k$ the field may be strengthened for increasing the output and the more the resistance $k$ is weakened the more the dynamo will partake of the nature of a shunt wound machine. If desired in certain circumstances, the resistance $j$ may be increased and the resistance $k$ may be decreased to such an extent that the dynamo will run as an ordinary shunt wound generator as may be necessary when it is desired to quickly charge the battery when the latter has been considerably discharged as happens when a train has been standing for some time with the lights burning. These regulatable resistances enable the output of the dynamo to be varied between wide limits and they also enable either a straight line output characteristic to be obtained, or one in which the output curve falls or rises as the speed increases. For suburban trains the batteries usually require more charging current than is the case with main line trains and the resistances $j$ $k$ enable a system to be readily regulated to suit either main line or suburban running.

It is preferred to make the resistance $m$ of iron or other similar temperature co-efficient metal wire, the resistance of which increases with increase in temperature of the metal.

It is advantageous to make the regulating poles $c$ of less width than the main poles $b$ and, in one practical arrangement regulating poles of about one third the width of the main poles have been used with good effect.

In order to provide for the charging of the battery or batteries at a suitable rate when the lamps are all switched off, the windings $l$ may be connected across the positive and negative mains with a resistance in series when the main switch of the consuming circuit is opened. For example, Fig. 2 shows an arrangement according to which the main lighting switch $q$ when in the off position connects the conductor $n$ across to the negative main $f$ through a resistance 1. Or as shown in Fig. 3 the opening of such main switch $q$ may be utilized for connecting the regulating pole windings $l$ across a resistance 2 in the conductor $e$ carrying the battery-charging current. It is a simple matter to provide a revolving switch, for example, which when turned to one position, will give the connections shown in full lines, Fig. 3, thereby connecting the lamps $p$ with the positive main $e$ through the resistance $m$ and short circuiting the resistance 2, but which, when turned to the off position, will give the dotted line connection thereby connecting the windings $l$ across the resistances 2 and $m$ in parallel. In the modification seen in Fig. 4 the second resistance $k$ is connected between the field winding $h$ and the positive terminal of the lamp resistance $m$, the latter being connected between the lamps and the negative conductor $f$. In the last named arrangement it will be possible for current to pass through the lamp resistance $m$ and regulating pole windings $l$ even when the switch $q$ is open and the lamps are not in circuit and the battery only is being charged, and by regulating the adjustable resistance $k$ the quantity of current flowing can be varied to suit requirements. With the arrangement seen in Fig. 4 the resistances can be adjusted as described above so that the dynamo will act as an ordinary shunt wound machine as may be desirable when, for example, it is desired to send for a time a large charging current to the battery in order to raise the voltage of the latter. If the resistances $j$ and $k$ are controlled by an electro-magnetic regulator connected across the battery, the rise in the voltage of the battery will automatically bring about the desired re-adjustment of the resistances $j$ and $k$ to the normal condition.

I claim:—

1. A car lighting system comprising in combination a dynamo having regulating poles, a battery to be charged thereby, a consuming circuit in circuit with the dynamo and with the battery, a resistance in said consuming circuit, and windings for the regulating poles connected across said resistance.

2. A car lighting system comprising in combination a dynamo having regulating poles, a battery to be charged thereby, a consuming circuit in circuit with the dynamo and with the battery, a resistance in said consuming circuit, and windings for the regulating poles connected across said resistance, and means for reducing the value of said resistance when the battery alone is supplying the consuming circuit.

3. A car lighting system comprising in combination a dynamo having regulating poles, a battery to be charged thereby, a consuming circuit in circuit with the dynamo and with the battery, a resistance in said consuming circuit, and windings for the regulating poles adapted to be reversely connected across said resistance according to the direction of running.

4. A car lighting system comprising in combination a dynamo having regulating poles, a battery to be charged thereby, a consuming circuit in circuit with the dynamo and with the battery, an automatic cut-in and out switch, a resistance in the consuming circuits, windings for the regulating poles connected across said resistance, and a second resistance adapted to be connected in shunt with said first resistance when the cut-in switch is open.

5. A car lighting system comprising in combination a dynamo having regulating poles, a battery to be charged thereby, a consuming circuit in circuit with the dynamo and with the battery, a resistance in said circuit, windings for the regulating poles connected across said resistance, a switch for controlling said circuit located between said resistance and the translating devices of said circuit, and a second resistance adapted to be connected in series with said windings when said switch is open.

6. A car lighting system comprising in combination a dynamo having regulating poles, a battery to be charged thereby, a consuming circuit in circuit with the dynamo and with the battery, a resistance in said circuit, windings for the regulating poles connected across said resistance, a switch for controlling said circuit, and a resistance modifying the effect of said windings controlled by said switch.

ALFRED HENRY DARKER.

Witnesses:
R. PHILLIPS,
H. D. JAMESON.